United States Patent
Pisanchyn et al.

[15] 3,681,460
[45] Aug. 1, 1972

[54] PROCESS FOR THE PREPARATION OF LYSINE

[72] Inventors: John Pisanchyn, Morristown; Robert Fuhrmann, Morris Plains; Stylianos Sifniades, Parsippany; Allen Abraham Tunick, Denville, all of N.J.

[73] Assignee: Allied Chemical Corporation, New York, N.Y.

[22] Filed: Aug. 25, 1969

[21] Appl. No.: 852,947

[52] U.S. Cl. ........260/566 A, 260/404.5, 260/482 R, 260/534 L
[51] Int. Cl. ............................................C07c 131/00
[58] Field of Search.....:................................260/566 A

[56] References Cited

UNITED STATES PATENTS 3,125,569   3/1964   Martin et al............260/566 A X
3,419,616   12/1968  Wood.....................260/566 A X

OTHER PUBLICATIONS

Chemical Abstracts, Vol. 67 Column 73238(b)(1967)

Primary Examiner—Leon Zitver
Assistant Examiner—Gerald A. Schwartz
Attorney—Arthur J. Plantamura and Herbert G. Burkard

[57] ABSTRACT

Lysine is produced by a process comprising the steps of

1. Nitrating cyclohexanone to form 2-nitrocyclohexanone;
2. Nitrosating the 2-nitrocyclohexanone to form 2-nitro-6-oximinocyclohexanone;
3. Ring opening the 2-nitro-6-oximinocyclohexanone in alcoholic base to form an ester of 2-oximino-6-nitrocaproic acid;
4. Hydrogenating the 2-oximino-6-nitro caproic acid alkyl ester to form an alkyl ester of lysine; and
5. Saponifying the lysine alkyl ester to afford lysine or a salt thereof.

1 Claim, No Drawings

PROCESS FOR THE PREPARATION OF LYSINE

BACKGROUND OF THE INVENTION

Lysine

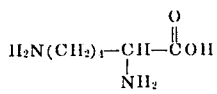

ps is well known as one of the essential amino acids. Its use in dietary supplements is unfortunately restricted due to its high price. This high price is necessitated by the fact that currently known synthetic methods for producing lysine involve expensive starting materials and reagents and/or complex processing steps.

SUMMARY OF THE INVENTION

It is an object of this invention to provide an inexpensive, facile route to lysine.

It has now been found in accordance with this invention that lysine can be readily produced from cyclohexanone by the following synthetic method:

1. Nitration of cyclohexanone to form 2-nitrocyclohexanone;
2. Nitrosation of said 2-nitrocyclohexanone to form 2-nitro-6-oximinocyclohexanone;
3. Ring opening said 2-nitro-6-oximinocyclohexanone in alcoholic base to form an alkyl ester of 2-oximino-6-nitrocaproic acid;
4. Hydrogenating said 2-oximino-6-nitrocaproic acid alkyl ester to form an alkyl ester of lysine; and
5. Saponifying said lysine alkyl ester to afford lysine or lysine hydrochloride.

This synthesis can be schematically represented as follows:

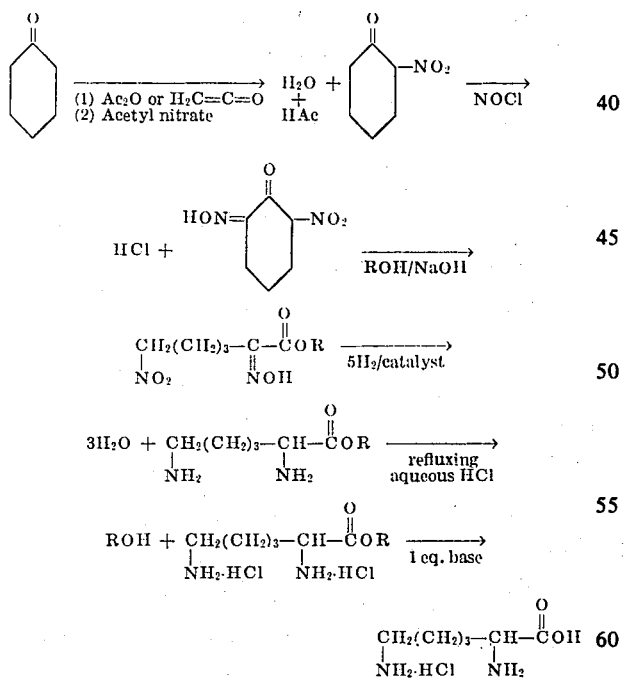

The first step in our novel synthesis of lysine is the nitration of cyclohexanone to form 2-nitrocyclohexanone. This is a known reaction and compound. The preferred method of nitration is to form the enol acylate of the carbonyl group, for example, by reaction of the cyclohexanone with a carboxylic acid anhydride or with ketene. The enol acylate is reacted with a nitrating agent such as acetyl nitrate to form the 2-nitrocyclohexanone. The preparation of 2-nitrocyclohexanone, also known as α-nitrocyclohexanone, is described, for example, in J. Org. Chem., 31, 357 (1966).

The second step in our synthetic sequence and the product thereof, i.e., 2-nitro-6-oximinocyclohexanone, are both unknown.

The nitrosation of 2-nitrocyclohexanone to form 2-nitro-6-oximinocyclohexanone is most suitably carried out in an inert solvent for the nitrocyclohexanone so as to provide good contact between the nitrocyclohexanone and the nitrosating agent and to facilitate temperature control. Although the nitrosation can be carried out at virtually any temperature between the freezing and boiling points of the selected solvent, we have found that the preferred reaction temperature is between −30° C and +10° C. Below −30° C, the reaction rate is very low. Above about +10° C, side reactions tend to occur which reduce the yield of 2-nitro-6-oximinocyclohexanone and cause the formation of difficult to remove contaminants. The preferred reaction temperature range is about −20° C to +5° C.

A suitable solvent should not only be liquid in the preferred reaction temperature range, but it must also be inert to the nitrosating agent being used. This limits the readily available usable solvents to halogenated $C_1$–$C_4$ alkanes and to alkane mono- and diethers of four to eight carbons. The term halogenated alkane connotes n- or isoalkanes that have at least one-third of the hydrogens thereof replaced by fluorine, chlorine or bromine, preferably fluorine or chlorine. Suitable examples of such halogenated alkanes include $CCl_4$, tetrachloroethane, dichloroethane, $CH_2Cl_2$, $CHCl_3$, tetrachloroethylene, bromoform, perfluorobutane, and the various fluorochlorohydrocarbons sold commercially under the trademark "Genetron" or "Freon." Suitable alkane ethers include diethyl ether, glyme, diglyme, diethyl carbitol, and the like. The solvent is preferably substantially or completely water free.

Suitable nitrosating agents include the $C_1$–$C_4$ alkyl nitrites, nitrosyl formate, nitrosyl chloride, nitrosyl bromide, and $N_2O_3$. The preferred nitrosating agent is methyl nitrite, or nitrosyl chloride. The nitrosation is ordinarily carried out by dissolving the 2-nitrocyclohexanone in solvent, cooling the solution to about −15° C, and then adding 1.0–1.5 mols of the nitrosating agent per mol of nitrocyclohexanone. The nitrosation reaction is ordinarily complete within from 1–12 hours after at least a molar equivalent of nitrosating agent has been added. Completion of the nitrosation reaction is most conveniently ascertained by the vapor phase chromatographic analysis of an aliquot of the reaction mixture. Although the reaction is not strongly endothermic or exothermic, it is desirable to maintain the reaction mixture within the desired temperature range through the course of the nitrosation reaction. The reaction is not pressure sensitive and can be carried out at ambient or superatmospheric pressure.

We have found that the nitrosation reaction proceeds much more readily in the presence of a strong acid catalyst. Any nonoxidizing acid having a pKa of less than 1 is suitable such as hydrochloric, hydrobromic, sulfuric, phosphoric, p-toluene sulfonic, or methane sulfonic acid. The amount of acid present in the reaction mixture is not critical but it should preferably be sufficient to make the solution 0.5–20 molar in acid. Because of its high volatility, hydrochloric acid is readily removed from the reaction mixture after completion of the reaction and for this reason it is preferred. In the case of HCl, the preferred concentration is 5 to 20 molar. The acid can be added prior to or simultaneously with the nitrosating agent, preferably prior to the nitrosating agent. Work-up of the nitrosation mixture, after completion of the reaction, is most advantageously carried out by stripping off the reaction solvent, any excess nitrosating agent, and the HCl catalyst under reduced pressure, preferably at a temperature below about 0° C. If a nonvolatile acid catalyst is used, it must be removed from the reaction mixture or neutralized prior to removal of the solvent by stripping.

The residue remaining after removal of solvent, excess nitrosating agent, and acid catalyst consists essentially of 2-nitro-6-oximinocyclohexanone which can be utilized without further purification in the next step which entails opening, i.e., cleaving, of the cyclohexanone ring to form an alkyl ester of 2-oximino-6-nitrocaproic acid. Alternatively, and preferably, the residue is purified by being triturated at low temperature with methanol or ethanol prior to ring opening.

It should be noted that this nitrosation procedure is equally applicable to the nitrosation of other α-nitrocycloalkanones having from 5 to 12 carbon atoms. The product compounds can be represented as follows:

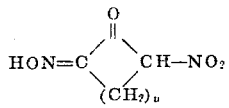

wherein $n$ is 2 to 9. These are novel compounds and can be ring-opened even as the six-membered ring compound to provide precursors for the biodynamic $C_5$ to $C_{12}$ α,ω-diamino acids.

This ring opening most suitably effected by heating the 2-nitro-6-oximinocyclohexanone at a temperature of about 50° to 90° C with an alcoholic solution of strong base.

Suitable alcohols are any of the $C_1$–$C_4$ normal alkanols, i.e., methanol, ethanol, n-propanol, and n-butanol, preferably methanol. Suitable bases include the alkali metal hydroxides or the alkali metal alkoxide of the alcohol used as solvent. The concentration of base is not critical, and we have found that in the range of 0.025–1.0 mols of base per mol of 2-nitro-6-oximinocyclohexane no significant effect is noted. Preferably 0.05–0.10 mols of base per mol of 2-nitro-6-oximinocyclohexanone is utilized.

The ring opening is rapid, and heating for about 1 hour is ordinarily sufficient to effect complete ring opening. Longer heating does no harm, however. The concentration of 2-nitro-6-oximinocyclohexanone in the alcoholic base solution is not critical--the only requirement is that at least one mol of alcohol be present per mol of 2-nitro-6-oximinocyclohexanone. For convenience of handling, the concentration of 2-nitro-6-oximinocyclohexanone in the alcoholic solution is preferably from about 1 to about 25 percent by weight.

The heating with alcoholic base results in ring opening with essentially simultaneous formation of the ester of 2-oximino- 6-nitrocaproic acid corresponding to the alcohol used as the solvent.

While we do not wish to be bound by any mechanistic interpretation, it is believed the ring opening reaction proceeds as follows:

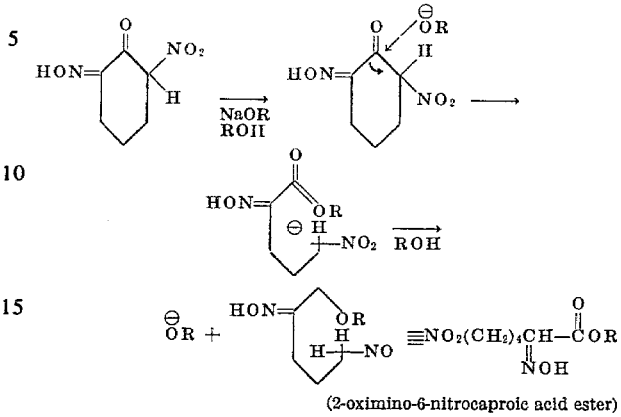

(2-oximino-6-nitrocaproic acid ester)

This 2-oximino-6-nitrocaproic acid ester is then recovered by various conventional methods including, for example, neutralization of any excess base with acid, evaporation of the alcohol solvent, and extraction of the nonvolatile residue with water to remove the alkali metal salt of the neutralizing acid thereby leaving the desired ester as a residue. Alternatively, the nonvolatile residue can be extracted with an organic solvent such as ether which affords an ethereal solution of ester, the ether then being evaporated off to afford the ester. Purification of this ester prior to the next step, i.e., reduction, is not necessary.

Reduction of the nitro and oximino groups of the ester to afford the ester of lysine is best effected by catalytic hydrogenation. For ease of handling, about a one-half to 10 weight per cent solution of the 2-oximino-6-nitrocaproic acid ester is dissolved in a suitable inert solvent such as a $C_1$–$C_4$ alcohol, or a $C_4$–$C_6$ mono- or diether such as glyme, diglyme, diethyl carbitol, diethyl ether, and the like, from 1 to 20 weight per cent based on the weight of the ester of hydrogenation catalyst added and the ester/solvent/catalyst mixture then heated, preferably with agitation, in a suitable pressure vessel at 20°–200° C under a hydrogen atmosphere. A hydrogen pressure of from about 10 up to as much as 5,000 psig is suitable. Ordinarily, a pressure of 50–500 psig is preferred. Hydrogenation is rapid and is ordinarily complete after from about 1 to 24 hours depending upon the hydrogen pressure, catalyst, degree of agitation, and temperature of hydrogenation.

Suitable catalysts include palladium on a support such as carbon, alumina, calcium carbonate, or barium sulfate. The concentration of palladium on the support is suitable from about 1 to 10 weight per cent.

The lysine ester is recovered from the hydrogenation mixture by filtering off the catalyst and evaporating off the solvent leaving behind the lysine ester as a residue. If the ester is the ethyl ester, it may be resolved to obtain the nutrionally active L-enantiomer or it may be used directly as a dietary supplement with or without further purification, e.g., by recrystallization. A suitable recrystallization solvent is a $C_1$–$C_4$ alkanol. If an ester other than the ethyl ester is present, hydrolysis to lysine by refluxing the ester in aqueous hydrochloric acid followed by neutralization with one equivalent of base and cooling results in precipitation of the lysine monohydrochloride, which may then be recovered by filtration. The hydrochloride is now ready for use as a food supplement or for resolution by known methods into the nutritionally active L-isomer.

If basic saponification to afford the basic lysine salt followed by neutralization is carried out, neutral lysine is obtained. This material is not generally used in food supplements because of its unpleasant odor—the odorless monohydrochloride being preferred. Suitable bases for saponification or neutralization are the alkali metal hydroxides or carbonates, and the alkaline earth metal oxides or hydroxides.

The invention can be more fully understood by reference to the following examples. All parts are parts by weight unless otherwise expressly noted.

EXAMPLE 1

A solution of 31.2 grams (0.218 mol) 2-nitrocyclohexanone in 600 ml. anhydrous ether was saturated with anhydrous HCl at 0° C. To this solution, 23 g. (0.223 mol) n-butylnitrite was added dropwise during 10 minutes under a nitrogen atmosphere while keeping the temperature at 0° to 5° C. After standing for an additional 10 minutes at 0°–5° C, the reaction mixture was stripped under reduced pressure in a rotary evaporator. The light yellow crystals of 2-nitro-6-oximinocyclohexanone (NOC) which formed in the concentrated solution were recovered by filtration and then washed with ether: weight after drying 13.0 g. (35 percent yield).

EXAMPLE 2

Nitrosation of Nitrocyclohexanone With Methyl Nitrite in Ether

Ten grams (0.070 mol) of 2-nitrocyclohexanone was dissolved in about 300 ml. of diethyl ether which had been saturated at 0° C atmospheric pressure with dry HCl gas. The solution was then treated with 6.0 ml. (6.0 grams, 0.098 mol) of methyl nitrite, added in one portion at −20° C. The solution was allowed to warm to −10° C and was kept at that temperature for 1.5 hours. The solution was then evaporated to dryness on the rotary evaporator keeping the temperature below 10° C. The residual yellow oil was scratched to induce crystallization, and the resulting yellow crystals of NOC were triturated with cold ether (100 ml.) and collected by filtration. Yield: 3.8 grams (32 percent); melting point, 160° C (with dec.).

EXAMPLE 3

Nitrosation of Nitrocyclohexanone with Methyl Nitrite in Glyme

A 10.0-gram (0.070 mol) sample of 2-nitrocyclohexanone was dissolved in 350 ml. of 10N HCl in dry 1,2-dimethoxyethane (glyme) and the resulting solution then treated with 6.0 ml. (6.0 gram, 0.098 mol) of methyl nitrite at −20° C. After 3.5 hours at −13° C, a 50-ml. aliquot was removed for work-up and analysis. Nearly quantitative conversion of the nitrocyclohexanone to the desired 1-nitro-6-oximinocyclohexanone was indicated by gas chromatographic analysis of the aliquot.

The remaining solution was worked up after an additional standing of one-half hour as follows: The volatile components were stripped on a rotary evaporator at −10° C and the residue triturated with cold methanol. The resulting yellow crystals of NOC were collected by filtration and washed with a few milliliters of cold methanol. The 50-ml. aliquot was worked up in a similar fashion. Yield from both portions: 7.74 grams (64.5 percent).

EXAMPLE 4

Nitrosation of α-Nitrocyclohexanone with Nitrosyl Chloride in Glyme

A 10.0-gram (0.070 mol) sample of α-nitrocyclohexanone was dissolved in 350 ml. of 10N HCl in glyme, and the solution then treated with 3.1 ml. (about 4.5 g, 0.07 mol) of nitrosyl chloride at −20° C. The temperature of the mixture was kept at −20° C for 2.5 hours and then at −15° C for 3 hours. At this point, the conversion of nitrocyclohexanone was 80 percent and the reaction mixture was evaporated to dryness on the rotary evaporator at about −10° C. The evaporation residue was triturated with about 20 ml. cold methanol, filtered, and washed with a few additional milliliters of cold methanol. The resulting light-yellow crystalline powder weighed 5.21 grams. The mother liquor contained an additional 0.93 grams for a total yield of 6.14 grams; yield 64 percent based on reacted nitrocyclohexanone.

EXAMPLE 5

To a solution of 10.0 grams (0.058 mol) of NOC in 400 ml. absolute methanol was added at 50° C a solution of 2.40 grams (0.058 mol) of sodium hydroxide in 400 ml. absolute methanol. A voluminous yellow precipitate appeared, which dissolved after several minutes. After standing at 50° C for 5 ½ hours, the reaction mixture was cooled to room temperature and then treated with a solution containing 5 ml. 12M HCl and 7 grams urea in 500 ml. water. The resulting solution was concentrated to 450 ml. by stripping under reduced pressure, and it was exhaustively extracted with ether.

After drying of the ether extracts and evaporation of the ether, 11.6 grams of crude methyl-2-oximino-6-nitrohexanoate was obtained. The material was of sufficient purity for hydrogenation without additional purification.

EXAMPLE 6

To a solution of 86 mg. (0.5 millimol) NOC in 7.5 ml. methanol at reflux, 0.5 ml. of an 0.5M solution of NaOH in methanol was added also at reflux temperature. The mixture remained clear. After refluxing for 140 minutes, analysis by visible spectroscopy (350-370 m$\mu$ band in $10^{-2}$M aqueous NaOH showed that the NOC had been consumed to the extent of at least 97 percent. Analysis by thin layer chromatography showed that the reaction mixture contained essentially only methyl-2-oximino-6-nitrohexanoate and no starting material.

EXAMPLE 7

The procedure of Example 6 was repeated with varying amounts of NaOH and NOC in methanol at reflux temperature. It was found that ring opening of NOC took place satisfactorily even with ratios NaOH/NOC as low as 0.025. A low NaOH/NOC ratio has the advantage of reducing salt by-product formation in the subsequent neutralization step prior to hydrogenation. The conversion of NOC after 140 minutes of refluxing is shown in the table below. In all cases, the only detectable product was methyl-2-oximino-6-nitrohexanoate.

NOC Reaction in Refluxing Methanol (Reaction time = 140 min.)

| NOC (mmol) | NaOH (mmol) | NaOH/NOC | Volume (ml.) | NOC Conversion (Mol %) |
|---|---|---|---|---|
| 0.50 | 0.250 | 0.500 | 8.0 | 97 |
| 0.50 | 0.050 | 0.100 | 8.0 | 99 |
| 0.50 | 0.025 | 0.050 | 8.0 | 99 |
| 0.50 | 0.025 | 0.050 | 2.0 | 99 |
| 1.00 | 0.250 | 0.250 | 2.0 | 94 |

EXAMPLE 8

To a solution of 0.258 g. (1.5 millimol) NOC in 21 ml. ethanol, 3.0 ml. of 0.1 molar ethanolic NaOH was added at reflux. After refluxing for 6 hours, ultraviolet analysis of the reaction mixture revealed that 87 percent of the NOC had been consumed. The reaction mixture was stripped to dryness and the residue was dissolved in 3 ml. chloroform and refined by passing through a column of 15 grams silica gel. Chloroform was used as the eluent. A cut composed of a chromatographically pure oily material was obtained. It weighed 0.166 grams. The infrared spectrum of this material was consistent with that of ethyl-2-oximino-6-nitrohexanoate.

EXAMPLE 9

To a solution of 0.258 grams (1.5 millimols) NOC in 5.0 ml. n-butanol, 3.0 ml. of 0.1N NaOH in n-butanol was added at 85° C. After standing for 6 hours at 85° C about 99 percent of the NOC was consumed. The reaction mixture was then flashed to dryness and refined by passing through a column of 15 grams silica gel using chloroform as the eluent. 0.185 Gram of a chromatographically pure oil was obtained. The infrared spectrum of this material was consistent with that of n-butyl-2-oximino-6-nitrohexanoate.

EXAMPLE 10

Hydrogenation of Methyl-6-Nitro-2-Oximinohexanoate

A 515-mg. (2.5mmol) sample of methyl-6-nitro-2-oximonohexanoate was dissolved in 20 ml. of methanol containing 1 ml. concentrated HCl and 500 mg. 5 percent palladium on carbon. The mixture was hydrogenated at 60° C and 50–70 psig hydrogen pressure in a Parr bomb. The uptake of hydrogen was 97 percent of theoretical in 69 hours. The mixture was filtered, evaporated to dryness on a rotary evaporator, and the residue refluxed with 50 ml. 6N HCl for 3 hours. The resulting solution was concentrated on a rotary evaporator to a thick syrup, which was dissolved in 10 ml. 95 percent EtOH at reflux. The solution was treated with 0.5 ml. pyridine in 1 ml. 95 percent ethanol, cooled slowly, and left standing for 25 hr. at room temperature followed by 16 hours in the refrigerator. The lysine hydrochloride which precipitated was collected by suction filtration, washed with ethanol, and dried in air at 120° C.

A total of 275 mg. was obtained. Analysis of the mother liquors indicated the presence of an additional 35 mg. of lysine hydrochloride, for a total yield of 310 mg. (68 percent). A small amount (30 mg.) of pipecolinic acid was also present in the mother liquor.

We claim:
1. The compound which is 2-nitro-6-oximino-cyclohexanone.

* * * * *